United States Patent

Nakaho

[11] Patent Number: 5,276,323
[45] Date of Patent: Jan. 4, 1994

[54] OPTICAL MOVEMENT DETECTOR DETECTING A POSITION OF AN OPTICAL GRAVITY CENTER

[75] Inventor: Junichi Nakaho, Aichi, Japan

[73] Assignee: Kabushiki Kaisha Tokai Rika Denki Seisakusho, Aichi, Japan

[21] Appl. No.: 897,760

[22] Filed: Jun. 12, 1992

[30] Foreign Application Priority Data

Jun. 13, 1991 [JP] Japan ............... 3-168786

[51] Int. Cl.$^5$ ............... G01D 5/34; H03M 1/22
[52] U.S. Cl. ............... 250/231.13; 250/231.14; 250/237 G
[58] Field of Search ............... 250/231.14, 231.16, 250/237 G, 211.K; 356/373, 374; 33/706, 707; 341/13

[56] References Cited

U.S. PATENT DOCUMENTS

| | | | |
|---|---|---|---|
| 3,748,486 | 7/1973 | Russell | 250/231.16 |
| 4,218,615 | 8/1980 | Zinn, Jr. | 250/231.16 |
| 4,654,523 | 3/1987 | Tanaka et al. | 250/231.14 |
| 4,691,101 | 9/1987 | Leonard | 250/231.16 |
| 4,948,968 | 8/1990 | Matsui | 250/231.14 |
| 4,970,511 | 11/1990 | Mills | 250/231.14 |
| 5,068,530 | 11/1991 | Ieki et al. | 250/231.16 |
| 5,155,355 | 10/1992 | Kabaya | 250/231.16 |

FOREIGN PATENT DOCUMENTS

| | | | |
|---|---|---|---|
| 2473702 | 7/1981 | France. | |
| 0085113 | 5/1983 | Japan | 250/231.16 |
| 63-229324 | 9/1988 | Japan. | |
| 1-109201 | 4/1989 | Japan. | |

Primary Examiner—Michael Messinger
Attorney, Agent, or Firm—Finnegan, Henderson, Farabow, Garrett & Dunner

[57] ABSTRACT

A movement detector includes a moving body having a slit pattern which is provided on it by forming a number of slit-shaped light transmitting parts at certain intervals in the direction of movement. As the moving body is moved, depending on the presence and absence of the light transmitting parts of the slit pattern, light images and dark images appear alternately on the light receiving surface of a semiconductor position detecting element while moving in one direction. In response to the light and dark images, the semiconductor position detecting element provides output currents, which detecting means utilizes to provide output pulses. The output pulses are utilized to detect not only the amount of movement of the moving body but also the direction of movement of the latter.

2 Claims, 4 Drawing Sheets

OPTICAL MOVEMENT DETECTOR DETECTING A POSITION OF AN OPTICAL GRAVITY CENTER

BACKGROUND OF THE INVENTION

This invention relates to a movement detector which outputs pulse-like electrical signals as a moving body moves.

One example of a conventional movement detector is a rotation detector which is designed as follows: In the rotary detector, the moving body is a rotary disk. A number of slit-shaped through-holes, namely, light transmitting parts are formed in the periphery of the rotary disk at predetermined angular intervals while leaving light intercepting parts therebetween. That is, in the periphery of the rotary disk, the light transmitting parts and the light intercepting parts occur alternately, thus forming a slit pattern. On the other hand, a light emitting element such as a light emitting diode is provided to apply light to the slit pattern of the rotary disk, and a light receiving element such as a photo-transistor is provided to receive light passed through the light transmitting parts to output pulse-like electrical signals. The electrical signals are processed to detect the rotation of the moving body.

With the above-described conventional movement detector, when it is required to detect the movement of a moving body with high resolution, the detection may be achieved if the angular interval of the light transmitting parts or the light intercepting parts is decreased. However, in this case, it is essential to eliminate the interference of light between adjacent light transmitting parts. For this purpose, it is necessary to use a precise light projecting optical system such as a precise lens. Hence, the conventional movement detector is rather difficult to design, and is accordingly high in manufacturing cost.

SUMMARY OF THE INVENTION

In view of the foregoing, an object of this invention is to eliminate the above-described difficulties accompanying a conventional movement detector.

More specifically, an object of the invention is to provide a movement detector which can detect the movement of a moving body with high resolution and which is not difficult to design and is low in manufacturing cost.

The foregoing object and other objects of the invention have been achieved by the provision of a movement detector which, according to the invention, comprises: a moving body having a slit pattern which is provided by forming a number of slit-shaped light transmitting parts therein at predetermined intervals in a direction of movement of the moving body; a light emitting element for applying light to the slit pattern; a semiconductor position detecting element for receiving light beams passed through the light transmitting parts of the slit pattern, to detect the positions of optical gravity centers thereof; and detecting means for detecting the movement of said moving body from the variations of output signals provided by the semiconductor position detecting element.

With the movement detector of the invention, as the moving body moves, depending on the presence and absence of the slit-shaped light transmitting parts of the slit pattern, light images and dark images appear alternately on the light receiving surface of the semiconductor position detecting element while moving in one direction. Thus, the semiconductor position detecting element for detecting the positions of optical gravity centers detects the movement of the light and dark images positively, so that the movement of the moving body is detected with high resolution.

The nature, principle, and utility of the invention will be more clearly understood from the following detailed description of the invention when read in conjunction with the accompanying drawings.

DETAILED DESCRIPTION OF THE INVENTION

One preferred embodiment of this invention, a rotation detector to which the technical concept of the invention is applied, will be described with reference to the accompanying drawings.

Figure 2:
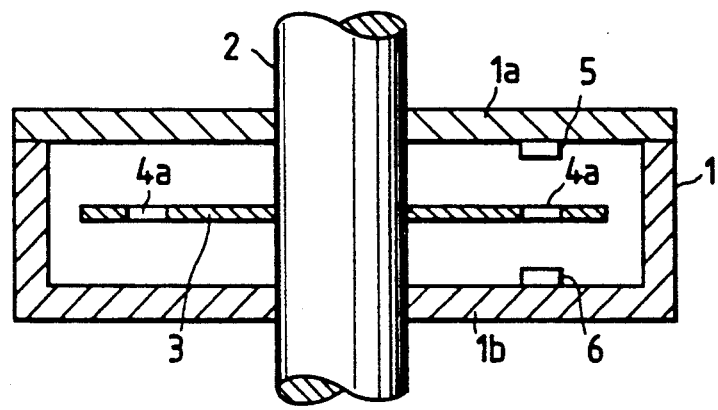
FIGS. 2 and 3 are a vertical sectional side view and a horizontal sectional plan view, respectively, showing essential components of the rotation detector.
Figure 3:
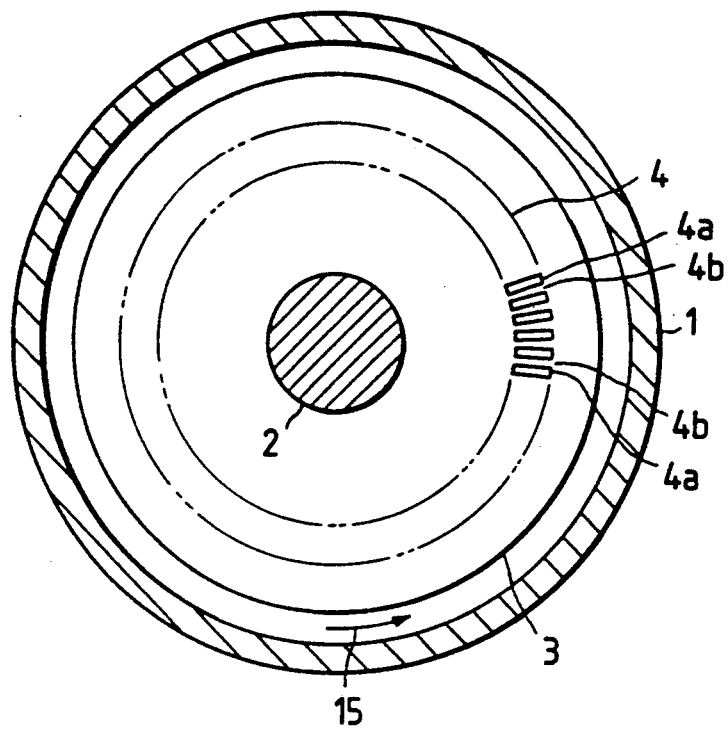
Figure 4:
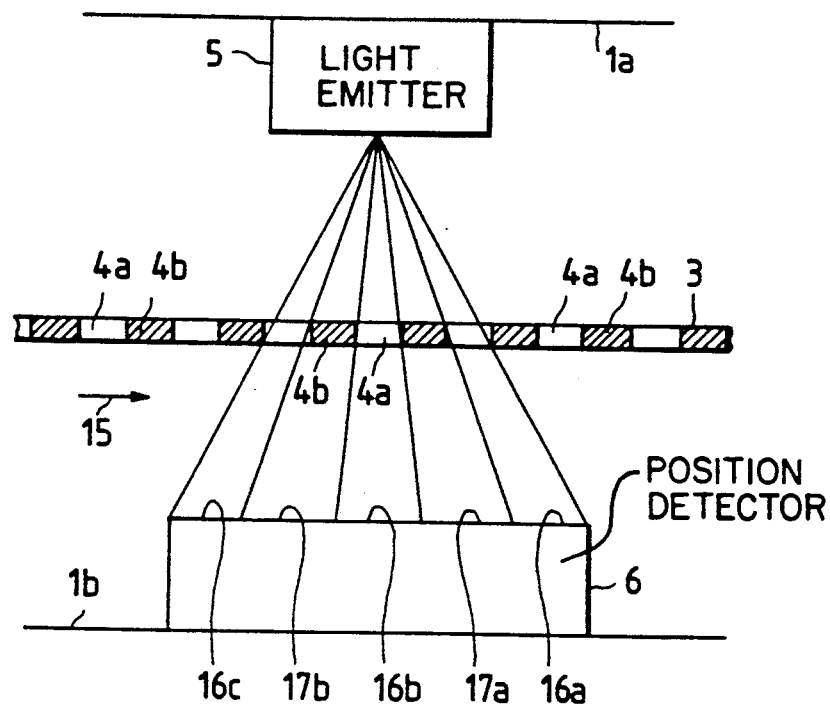
FIG. 4 is an enlarged sectional side view showing essential components of the rotation detector.
Figure 5A:
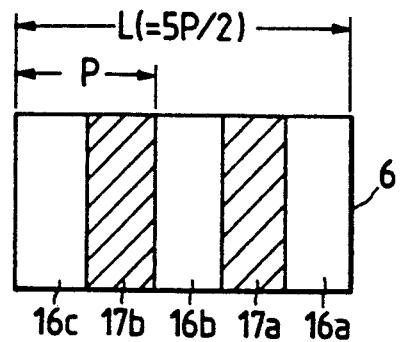
FIG. 5 (A), 5 (B), 5 (C), 5 (D), 5 (E), and 5 (F) are plan views for a description of the reception of light by a semiconductor position detecting element in the rotation detector.
Figure 5B:
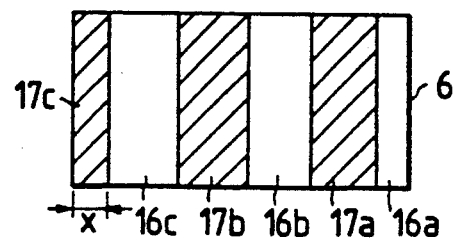
Figure 5C:
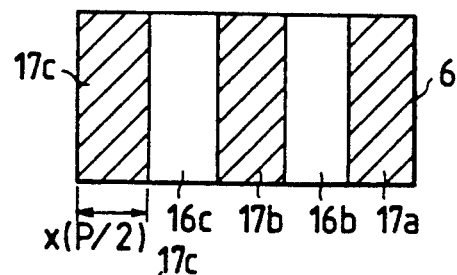
Figure 5D:
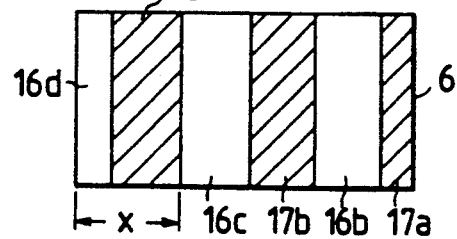
Figure 5E:
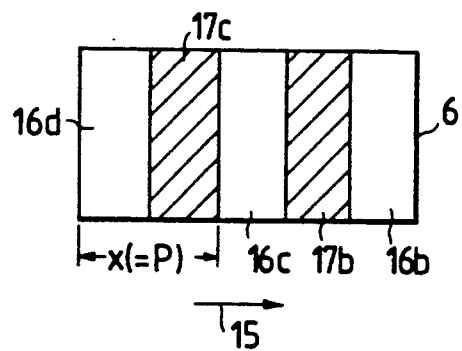
Figure 5F:
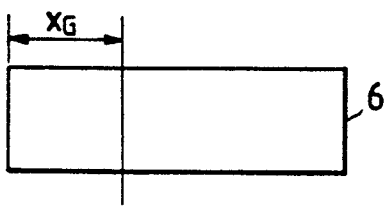
Figure 6A:
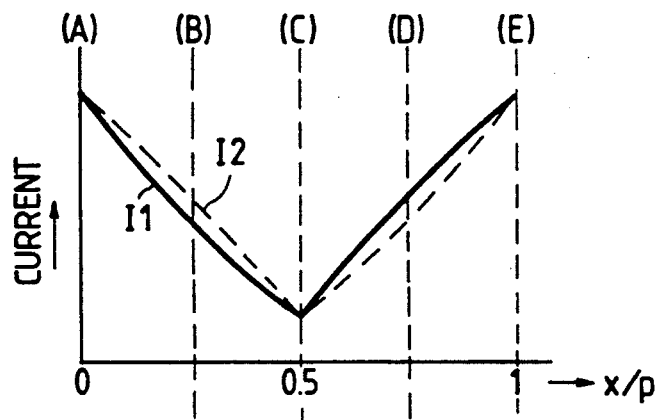
FIG. 6 (a), 6 (b), 6 (c), 6 (d) and 6 (e) are waveform diagrams showing the waveforms of signals at various circuit points in the block diagram of FIG. 1.
Figure 6B:
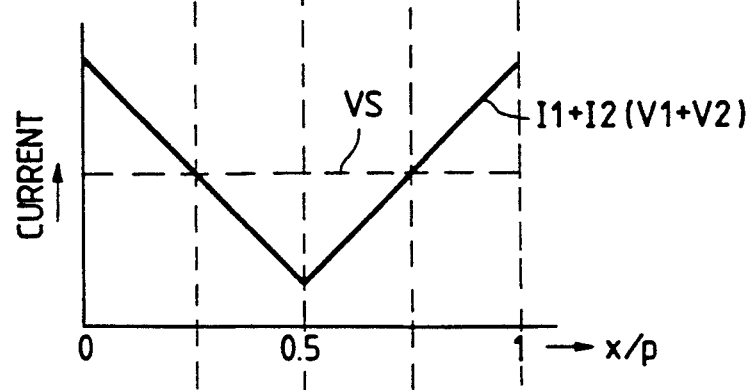
Figure 6C:
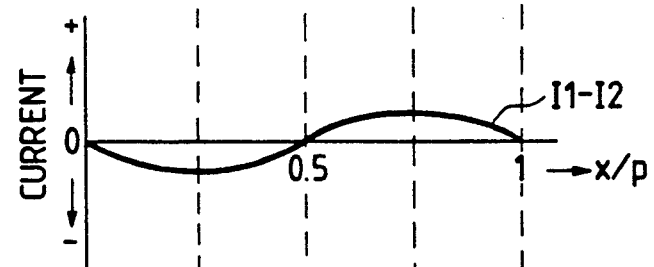
Figure 6D:
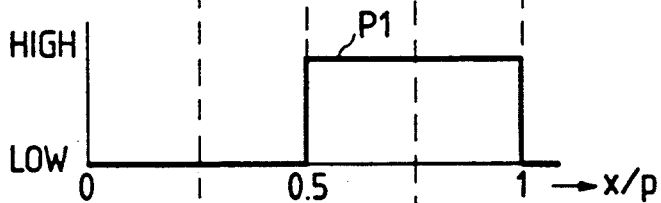
Figure 6E:
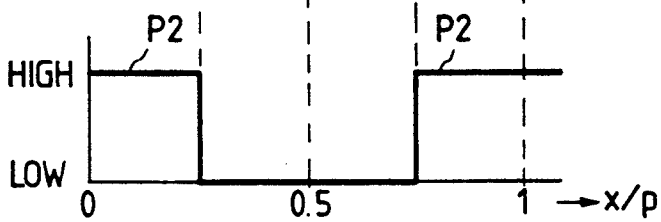

As shown in FIGS. 2 through 4, a casing 1 is cylindrical, and has a shaft 2 which is extended along the central axis of the casing 1. The casing 1 incorporates a moving body, namely, a rotary disk 3, which is fixedly mounted on the shaft 2 in such a manner that the disk 3 is coaxial with the shaft 2. The rotary disk 3 is made of an opaque material. A number of slit-shaped through-holes, namely, light transmitting parts 4a are formed in the periphery of the rotary disk 3 at predetermined angular intervals while leaving light intercepting parts 4b therebetween. That is, in the periphery of the rotary disk 3, the light transmitting parts 4a and the light intercepting parts 4b occur alternately, thus forming a slit pattern 4.

The casing 1 has a top wall 1a, and a bottom wall 1b. A light emitting element 5 such as a light emitting diode is provided on the inner surface of the top wall 1a to apply light to the slit pattern 4, while a semiconductor position detecting element 6 (hereinafter referred to as "a PSD (position sensitive device) 6", when applicable) is provided on the inner surface of the bottom wall 1b in such a manner that it is confronted through the slit pattern 4 with the light emitting element.

Figure 1:
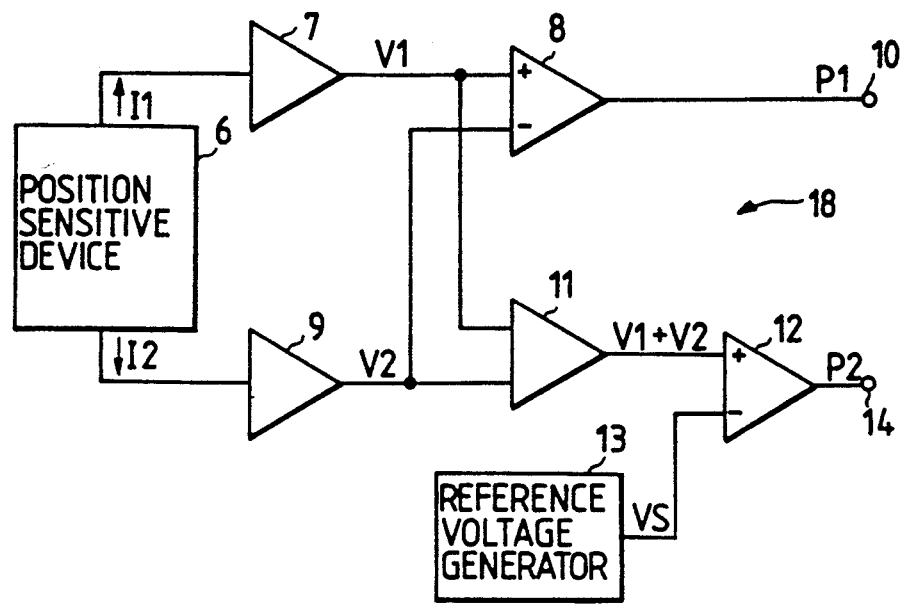
FIG. 1 is a block diagram showing the electrical arrangement of a rotation detector, which constitutes one embodiment of this invention.

Now, the electrical arrangement of the rotation detector will be described with reference to FIG. 1. One output terminal of the PSD 6 is connected through a current-to-voltage conversion amplifier 7 to the non-inversion input terminal (+) of a comparator 8, and the other output terminal of the PSD 6 is connected through a current-to-voltage conversion amplifier 9 to the inversion input terminal (−) of the comparator 8. The output terminal of the comparator 8 is connected to an output terminal 10. The output terminals of the current-to-voltage conversion amplifiers 7 and 9 are connected to both input terminals of an addition amplifier 11, respectively. The output terminal of the addition amplifier 11 is connected to the non-inversion input terminal (+) of another comparator 12, the inversion input terminal (−) of which is connected to a reference voltage generator 13 adapted to output a reference voltage VS. The output terminal of the comparator 12 is connected to an output terminal 14.

The operation of the rotation detector thus constructed will be described with reference also to FIGS. 5 and 6.

It is assumed that the rotary disk 3 is turned in the direction of the arrow 15 in FIG. 3, and so in FIG. 4. As the rotary disk is turned (moved), light images 16 formed when light from the light emitting element 5 passes through the light transmitting parts 4a of the slit pattern 4, and dark images formed, in contrast to the light image, when the light is intercepted by the light intercepting parts 4b are alternately projected onto the light receiving surface of the PSD 6. The light images 16 and the dark images 17 are moved in the direction of the arrow 15 as shown in FIG. 5.

As shown in FIG. 5, it is assumed that the light transmitting parts are arranged at angular intervals of P, and the area ratio of the light image 16 (corresponding to the light transmitting part 4a) to the dark image 17 (corresponding to the light intercepting part 4b) is 1:1, for simplification in description, and the length L of the PSD 6 is 5P/2. As the slit pattern 4 is moved in the direction of the arrow 15, the light and dark images 16 and 17 on the light receiving move as shown in FIGS. 5 (A) to (E).

It is assumed that in the case of FIG. 5 (A), light images 16a, 16b and 16c, and dark images 17a and 17b appear alternately, and furthermore it is assumed that, in FIG. 5, the amount of movement of the slit pattern 4 is x, and in FIG. 5 (A), x=0. Therefore, in the case of FIG. 5 (B), the light image 16a decreases in area, and instead another dark image 17c appears and increases in area. In the case of FIG. 5(C), x=P/2, and the light image 16a disappears, and instead the dark image 17c increases to a maximum area. In the case of FIG. 5 (D), the dark image 17a decreases in area, and instead another light image 16d appears and increases in area. In the case of FIG. 5 (E), x=P, the dark image 17a disappears, and instead the light image 16d increases to a maximum area. Thus, FIGS. 5 (A) to (E) correspond to the fact that the slit pattern has moved by one angular interval P.

When the light and dark images 16 and 17 are moved on the light receiving surface of the PSD in this manner; that is, when the positions of optical gravity centers are moved in this way, then currents I1 and I2 are provided at the pair of output electrodes of the PSD 6.

With t=x/P, the currents I1 and I2 of the PSD are as follows:

In the case of $0 \leq t \leq 0.5$ ($0 \leq x \leq P/2$), $$I1 = S(15 - 12t + 4t^2)/10 \tag{1}$$

$$I2 = S(15 - 8t - 4t^2)/10 \tag{2}$$

$$I1 + I2 = S(3 - 2t) \tag{3}$$

$$I1 - I2 = 2S(2t^2 - t)/5 \tag{4}$$

In the case of $0.5 \leq t \leq 1$ ($P/2 \leq x \leq P$), $$I1 = S(3 + 16t - 4t^2)/10 \tag{5}$$

$$I2 = S(7 + 4t + 4t^2)/10 \tag{6}$$

$$I1 + I2 = S(1 + 2t) \tag{7}$$

$$I1 - I2 = -2S(2t^2 - 3t + 1)/5 \tag{8}$$

The currents I1 and I2 represented by Equations (1) and (5) and Equations (2) and (6) are as indicated in FIG. 6 (a). The sums of the currents I1 and I2 represented by Equations (3) and (7) are as indicated in FIG. 6 (b). The differences of the currents I1 and I2 represented by Equations (4) and (8) are as indicated in FIG. 6 (c).

The parameter "S" is a constant that represents a characteristic or attribute of the PSD or like structure. More particularly, the parameter "S" means the current generated by one completely light image of PSD 6 (for example, the reference numeral 16b of FIG. 5(A) designates the light image, whereas the reference numeral 16a of FIG. 5(B) designates the dark image). In the case of x−0 (t−0), three completely light images exist on the PSD. Therefore, equation (3) becomes $$I_1 + I_2 = S(3 - 2 \times 0) = 3S$$

Thus, the whole current $(I_1 + I_2)$ generated by the PSD is three times the current S generated by one completely light image.

In FIGS. 5 (A) to (E), the positions of optical gravity centers are moved on the light receiving surface of the PSD as follows. The position of optical gravity center is expressed by the following equation.

$$X_G = L \cdot \frac{I_2}{I_1 + I_2} \quad \text{(In FIG. 5 (F), the length of } X_G \text{ is measured from the left end of the PSD)}$$

Therefore, in FIG. 5. (A), the position of optical gravity center is as follows.

$$X_G = \frac{L}{2} \quad \text{(the center of the PSD)}$$

In FIG. 5 (B), the position of optical gravity center is as follows.

$$X_G = \frac{15 - 8t - 4t^2}{10(3 - 2t)} \cdot L \left( > \frac{L}{2}, \text{ the right side from the center of the PSD} \right)$$

In FIG. 5 (C), the position of optical gravity center is as follows.

$$X_G = \frac{L}{2} \quad \text{(the center of the PSD)}$$

In FIG. 5 (D), the position of optical gravity center is as follows.

$$X_G = \frac{7 + 4t + 4t^2}{10(1 + 2t)} \cdot L \left( < \frac{L}{2}, \text{ the left side from the center of the PSD} \right)$$

In FIG. 5 (E), the position of optical gravity center is as follows.

$$X_G = \frac{L}{2} \text{ (the center of the PSD)}$$

The currents I1 and I2 produced by the PSD 6 are applied to the current-to-voltage conversion amplifiers 7 and 9, where they are converted into voltages V1 and V2 proportional to themselves, respectively. Those voltages are subjected to comparison by the comparator 8. That is, the comparator 8, as shown in FIG. 6 (d), provides a high level output pulse P1 when V1≧V2 (i.e., I1≧I2). On the other hand, the voltages V1 and V2 are applied to the addition amplifier 11. The waveform of the output of the addition amplifier 11 is proportional to that which is shown in FIG. 6 (b). The output of the addition amplifier 11 is applied to the comparator 12, where it is compared with the reference voltage VS (indicated in FIG. 6 (b) for convenience in description) provided by the reference voltage generator 13. Thus, the comparator 12, as shown in FIG. 6 (e), provides a high level output pulse P2 when V1+V2≧VS.

Hence, the amount of movement of the rotary disk 3; that is, the angle of rotation of the latter can be detected by counting the output pulse P1 or P2.

On the other hand, as is apparent from the above description, there is a phase difference between the output pulses P1 and P2. Hence, in the case where, with one of the output pulses as a reference, the other output pulse is taken into account, the phase relation between them is reversed depending on the direction of rotation of the rotary disk. Accordingly, by measuring the phases of the output pulses P1 and P2, the direction of rotation (or movement) of the rotary disk 3 can be detected.

Thus, the embodiment of the invention has the following effects:

As was described above, as the rotary disk 3 turns, the slit pattern forms the light and dark images 16 and 17 on the light receiving surface of the PSD. In response to the light and dark images 16 and 17, the PSD produces the currents I1 and I2. The current I1 and I2 are utilized by detecting means 18 comprising the current-to-voltage conversion amplifiers 7 and 9, the comparators 8 and 12, the addition amplifier 11 and the reference voltage generator 13. That is, the detecting means 18 utilizes the currents I1 and I2, to provide pulse signals, namely, the output pulses P1 and P2. By counting the output pulse P1 or P2, the angle of rotation of the rotary disk 3 can be detected. In addition, the direction of rotation of the rotary disk 3 can be detected from the phases of the output pulses P1 and P2.

In this operation, the PSD 6 detects as electrical signals, namely, the currents I1 and I2 the movement of the light and dark images 16 and 17 corresponding to the slit patter 4; that is, the movement of the positions of optical gravity centers. Therefore, even when the angular interval P is decreased, the rotation detector can positively provide the output pulses P1 and P2. Hence, the movement detector of the invention is free from the difficulty that it is difficult to design because it is necessary to use a precise optical system, and can detect the movement of a moving body with high resolution, at low cost.

In the above-described embodiment, the technical concept of the invention is applied to the rotation detector having the rotary disk 3; however, the invention is not limited thereto or thereby. That is, the technical concept of the invention may be applied to other movement detectors such as for instance a linear movement detector for detecting the linear movement of a moving body.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A movement detector comprising:
   a moving body having a slit pattern provided by forming a plurality of slit-shaped light transmitting parts at predetermined intervals therein in a direction of movement of said moving body;
   a light emitting element for applying light to said slit pattern of said moving body;
   a position detecting element for receiving light beams passed through said light transmitting parts of said slit pattern to detect a position of an optical gravity center of said light beams and to generate output signals; and
   detecting means for detecting a movement of said moving body from variations of output signals outputted by said position detecting element.

2. A movement detector as claimed in claim 1, wherein said position detecting element generates said output signals in accordance with the positions of said optical gravity center of said light beams.

* * * * *